W. W. Shaw,
Pencil.

No. 1319. Reissued June 21, 1862.

Witnesses
H. J. Brooks
[illegible]

Levi L. Tower

UNITED STATES PATENT OFFICE.

WILLIAM W. SHAW, OF TROY, NEW YORK, ASSIGNOR, BY MESNE ASSIGNMENTS, TO LEVI L. TOWER.

RUBBER HEAD FOR LEAD-PENCILS, &c.

Specification forming part of Letters Patent No. 23,504, dated April 5, 1859; Reissue No. 1,319, dated June 24, 1862.

*To all whom it may concern:*

Whereas, WILLIAM W. SHAW, a citizen of the United States of America, and now or late a resident of Troy, in the State of New York, did make a new and useful invention having reference to Lead-Pencils, Ink-Erasers, &c., and on the said invention did apply for and procure Letters Patent of the United States of America, the same bearing date the fifth day of April of the year one thousand eight hundred and fifty-nine; and whereas, by sundry assignments duly recorded or to be recorded in the Patent Office of the said United States, I, LEVI L. TOWER, a resident of Cambridge, in the State of Massachusetts, have become the sole owner of the said invention and Letters Patent, and whereas the said patent is believed to be inoperative by reason of an insufficient specification; now, therefore, I, the said LEVI L. TOWER, do hereby declare the said invention of the said SHAW to be more fully described in the following specification and represented by the accompanying drawings, of which—

Figure 4:
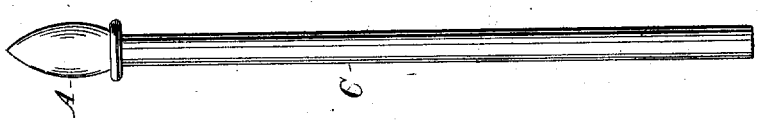
Figure 3:
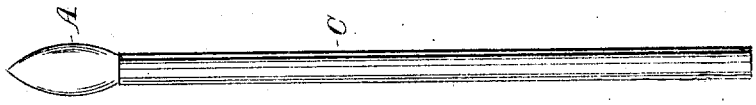
Figure 1:
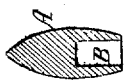
Figure 2:
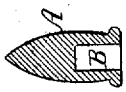

Figure 1 represents a vertical and axial section of a rubber or elastic erasive head to be applied to a lead-pencil. Fig. 2 is one of a somewhat different form, inasmuch as its lower part is provided with an astragal or bead. Figs. 3 and 4 represent these heads as applied to or combined with lead-pencils.

The elastic erasive head shown at A in the figures is intended to fit upon a lead-pencil at or near one end thereof, and to be so made as to surround the part on which it may be placed and be held in place by cement or by the inherent elasticity of the material of which the head may be composed. The said head is to be of india-rubber, or some elastic composition or material capable of erasing or rubbing out lead-pencil marks from paper, and it may have the form shown by the drawings, or an approximation thereto, or it may have any other form convenient for the purpose, so long as it is made to encompass the pencil and present a rubbing-surface about the sides of the same or those of a tenon extending from it.

The drawings exhibit the elastic head so made as to cover the end as well as to extend around the sides of the pencil when applied to one, the head being in such case constructed with a socket, B, the diameter of which is such as to enable the head to be slipped on and fitted closely to a pencil. In order to secure the head permanently to a pencil it may be cemented on it, but generally speaking the elasticity of the rubber or material composing the head will suffice to hold the head in place.

The pointed form of the elastic pencil-head, as shown in the drawings, will often be found convenient for acting on a narrow surface of paper. The head, however, may be made blunt or with a semi-spherical outer end, the remainder being either cylindrical, ovated, or of the form of an inverted truncated cone, and the socket may extend such distance into the head as may be desired.

The lead-pencil shown at C, in Figs. 3 and 4, may be supposed to be of the ordinary construction—that is, to be composed of a narrow strip of plumbago or other marking substance or composition and a wooden holder or case, within which the strip may be disposed and fixed.

The elastic or rubber pencil-head, made as described, is also applicable to other kinds of pencils or articles used for writing or marking, as well as those used for erasing ink-marks, &c.

I do not claim the combination of a block or piece of india-rubber or other erasive composition and a lead-pencil by means of a metallic ferrule or socket fixed on one end of the pencil and containing the rubber or erasive composition; but—

I claim—

1. The combination of a lead pencil and an elastic rubber ferrule or head made so as to encompass the cylindrical surface of the pencil or a tenon therefrom, substantially in manner as specified.

2. As a new manufacture, an elastic erasive pencil-head, made substantially as described.

LEVI L. TOWER.

Witnesses:

F. A. BROOKS,

F. P. HALE, Jr.